United States Patent
Wiegert et al.

(10) Patent No.: US 8,042,330 B2
(45) Date of Patent: Oct. 25, 2011

(54) TORQUE CONVERTER HAVING WELD FREE BLADES

(75) Inventors: Benedikt Wiegert, Oberkirch (DE); Patanjali Peri, San Jose, CA (US)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 628 days.

(21) Appl. No.: 12/157,690

(22) Filed: Jun. 12, 2008

(65) Prior Publication Data

US 2009/0000289 A1 Jan. 1, 2009

Related U.S. Application Data

(60) Provisional application No. 60/934,676, filed on Jun. 15, 2007.

(51) Int. Cl.
*F16H 41/00* (2006.01)
*F16H 41/28* (2006.01)
(52) U.S. Cl. ............................................. 60/367; 60/364
(58) Field of Classification Search .................. 60/330, 60/346, 364, 367; 416/197 C
See application file for complete search history.

(56) References Cited

U.S. PATENT DOCUMENTS

| | | | |
|---|---|---|---|
| 2,660,957 A | | 12/1953 | Koskinen |
| 3,545,883 A | * | 12/1970 | Iijima ............................... 60/367 |
| 3,673,659 A | | 7/1972 | Ishii et al. |
| 3,817,656 A | | 6/1974 | Batteux |
| 4,868,365 A | * | 9/1989 | Farone et al. ............... 29/889.21 |
| 5,522,220 A | * | 6/1996 | Locker ............................. 60/364 |
| 5,794,436 A | | 8/1998 | Maeda |
| 5,893,704 A | | 4/1999 | Prater |
| 6,226,985 B1 | * | 5/2001 | Sasse et al. ...................... 60/367 |
| 6,957,530 B2 | * | 10/2005 | Schleicher et al. .............. 60/364 |

* cited by examiner

*Primary Examiner* — Thomas E Lazo
(74) *Attorney, Agent, or Firm* — Simpson & Simpson, PLLC (57) ABSTRACT

A torque converter structure having a plurality of high efficiency secure weld free connections between blades and the shells of the pump and turbine that reduces flow between the blades and the shells. At least one blade within the torque converter is securely mechanically attached to the shell of the pump or turbine in the absence of welding by providing a tab on the blade that is bent on a portion that passes through a slit in the shell to secure the blade to the shell and by inserting a major part (greater than 50%) of a portion of an edge of the blade, that runs coextensively with a surface of the shell into a depression in that shell until the edge of the blade diverges from the shell. The invention also includes the unique blade and shell and a method for using them to make a torque converter of the invention.

7 Claims, 9 Drawing Sheets

TORQUE CONVERTER HAVING WELD FREE BLADES

CROSS-REFERENCE TO RELATED APPLICATIONS

This application claims the benefit under 35 U.S.C. §119 (e) of U.S. Provisional Application No. 60/934,676 filed on Jun. 15, 2007 which application is incorporated herein by reference.

FIELD OF THE INVENTION

This invention relates to a torque converter having a rotatable pump, for connection with a drive, where the pump has blades connected to a pump shell that are designed to direct fluid flow to blades on a shell of a turbine to cause the turbine to rotate. The turbine is designed for connection to an apparatus to be driven, usually a transmission for driving a vehicle.

BACKGROUND OF THE INVENTION

Hydraulic torque converters, devices used to change the ratio of torque to speed between the input and output shafts of the converter, have revolutionized energy transfer from engines. This is especially apparent in vehicles such as automobiles, trucks, tractors, and boats where hydraulic means is provided to transfer energy from a power shaft of an engine to a drive mechanism, e.g., drive shaft or automatic transmission, while smoothing out engine power pulses. A torque converter, arranged between the engine and a transmission, includes three primary components: an impeller, sometimes referred to as a pump, directly connected to the converter's cover and from the converter's cover to the engine's power shaft, e.g. a crankshaft; a turbine, similar in structure to the impeller, however the turbine is connected to the input shaft of the transmission; and, a stator, located between the impeller and turbine, which redirects the flow of hydraulic fluid exiting from the turbine thereby providing additional rotational force to the pump.

Figure 2:
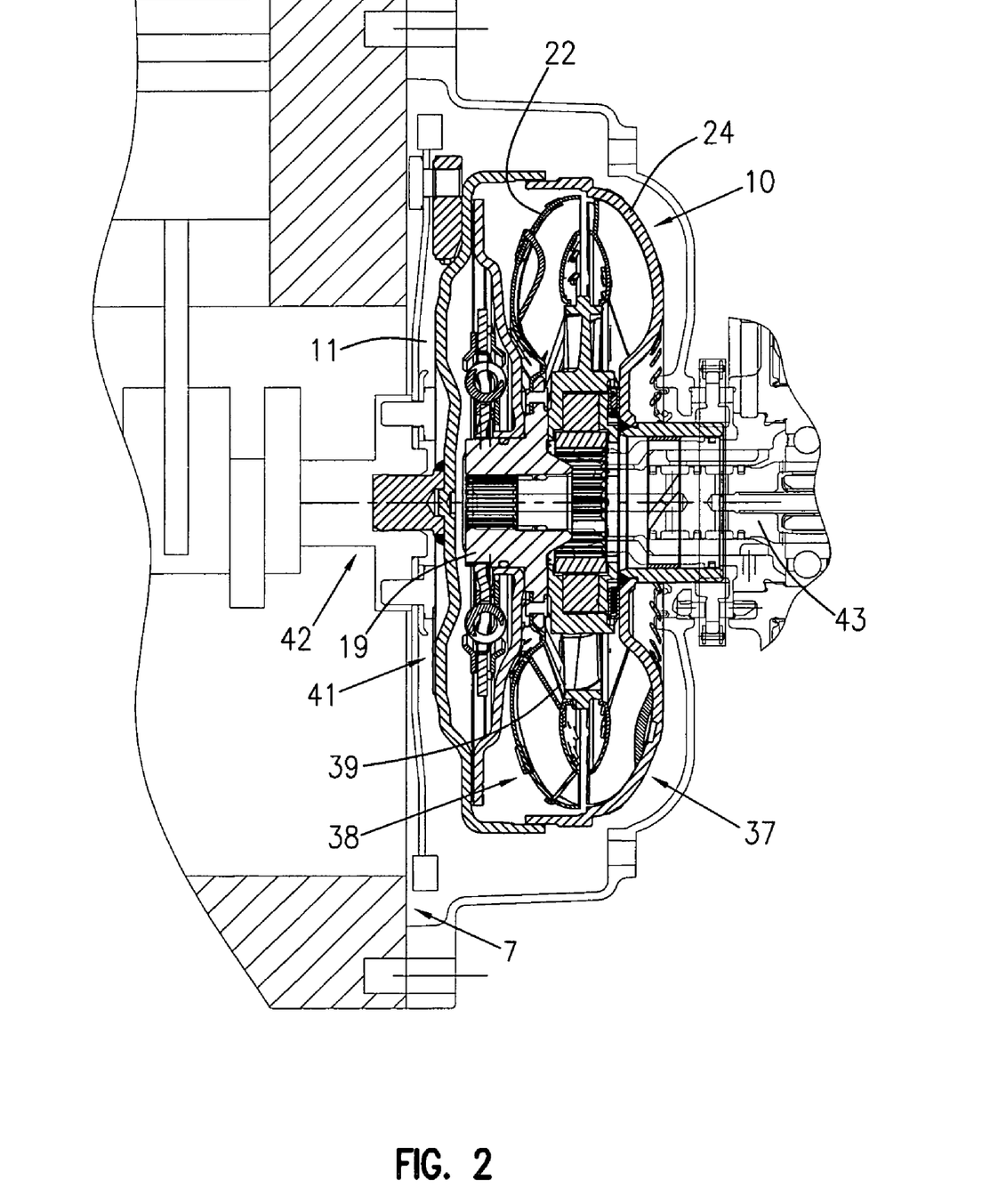
FIG. 2 is a cross sectional view of a torque converter generally showing relationship of parts as known in the prior art.

A cross sectional view of a common torque converter configuration is shown in FIG. 2.

Figure 1:
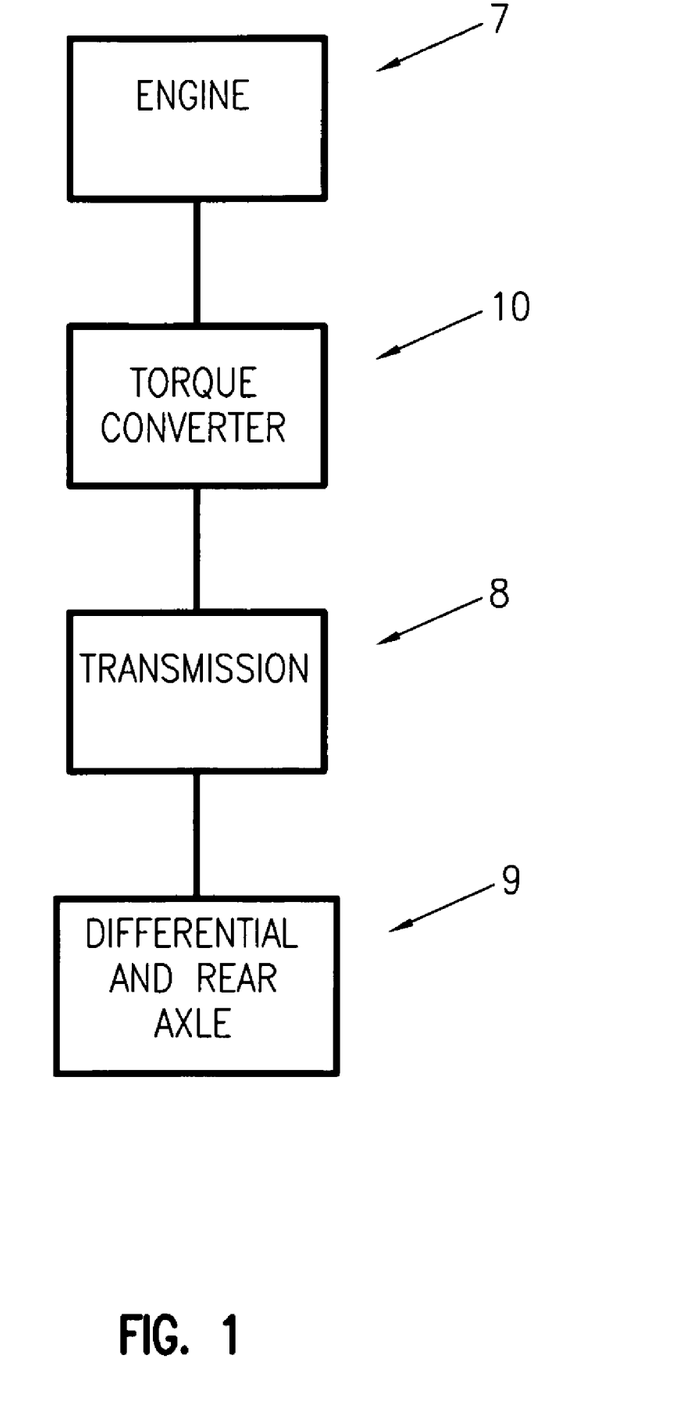
FIG. 1 is a diagram showing interrelationship between an engine 7 a torque converter 10, a transmission 8 and differential and rear axle 9.

The three main components of the torque converter as shown in FIG. 2 are the pump 37, turbine 38, and stator 39. The stator is used to redirect the flow of returning fluid to increase efficiency. The turbine and the pump are rotatable assemblies, in large part formed in the shape of hollow shells 22, 24, respectively that rotate radially. The torque converter 10 becomes a sealed chamber when the pump 37 is welded to a cover 11. In common embodiments, the cover 11 is connected to flexplate 41 which, in turn, may be bolted to a crankshaft 42 of an engine 7 (FIGS. 1 and 2). The cover can be connected to the flexplate using lugs or studs welded to the cover. The welded connection between the pump and cover transmits engine torque to the pump. Therefore, the pump always rotates at engine speed. The function of the pump is to use this rotational motion to propel fluid radially outward and axially toward the turbine. Therefore, the pump is a centrifugal pump propelling fluid from a small radial inlet to a large radial outlet, increasing the energy in the fluid.

In a torque converter 10 a fluid circuit is created by the pump (sometimes called an impeller), the turbine, and the stator (sometimes called a reactor). The fluid circuit allows the engine to continue rotating when the vehicle is stopped, and to accelerate the vehicle when desired by a driver. The torque converter supplements engine torque through torque ratio, similar to a gear reduction.

Turbine 38 uses the fluid energy it receives from pump 37 to propel the vehicle. Turbine shell 22 is connected to a turbine hub 19. Turbine hub 19 usually uses a spline connection to transmit turbine torque to transmission input shaft 43. The input shaft is connected to the wheels of the vehicle through gears and shafts in transmission 8 and axle differential 9 (FIG. 1). The force of the fluid impacting the turbine blades is output from the turbine as torque.

FIG. 2 does not clearly show means for attachment of blades to a turbine or pump. This figure may be considered non-pertinent prior art.

Torque converters as above described are well known in the art. Traditionally, the blades have been connected to their respective pump or turbine by means of welding. It is to be understood that "welding" in this sense is to be broadly construed. "Welding" is intended to include the following:

Direct fusion of the blades to the shell of the pump or turbine by melting and subsequent hardening at their interface;

Connection by means of an intermediate or connecting molten metal as occurs in gas or arc welding using a metal connecting material usually selected from copper, iron and alloys of at least two of iron, copper, tin, zinc, lead, aluminum, silver, cobalt, chromium and nickel, an example of this method being described in U.S. Pat. No. 3,673,659; and Connection using a plastic material that is usually a cross linked organic plastic such as an epoxy resin, e.g. as described in U.S. Pat. No. 3,817,656.

The most common form of welding utilized has been brazing.

It has been suggested that blades might be secured without welding by utilizing mechanical fastenings such as tabs on a blade that are inserted through a slit, slot or recess in a pump or turbine shell. Unfortunately, such devices have had serious disadvantages.

A major disadvantage has been that the blade is not held as securely as when welding is used and the blade may thus vibrate to cause noise, part wear and eventual catastrophic failure. Examples of such devices are described in U.S. Pat. Nos. 2,660,957; 3,673,659; 5,794,436 and 5,893,704.

A further major disadvantage has been that there has been an inability, by such mechanical fastening, to obtain a tight fit of the blade with the pump or turbine shell. This results in significant inefficiency since fluid at the pump can pass between the blade and pump shell thus failing to direct that portion of the fluid to the turbine with the attendant loss of efficiency. This loss of efficiency is further increased by fluid passing between blades and the turbine shell thus failing to direct kinetic energy in that fluid to turn the turbine. Examples of such devices are described in U.S. Pat. Nos. 2,660,957; 3,673,659 and 5,794,436.

Yet another disadvantage is that the mechanical method of attachment may be difficult, complex or time consuming, e.g. rivets or similar connectors are required or the blades and bodies are of complex shapes that are difficult or expensive to manufacture and may require complex interlocking. Examples of such devices are for example disclosed in U.S. Pat. Nos. 2,660,957; 3,673,659; and 5,794,436.

U.S. Pat. No. 5,893,704 describes a structure; wherein, tabs on the blades are described that fit within recesses in the shell of a turbine. An advantage resulting from this structure is that fluid flow between the blades and the shell is restricted thus increasing efficiency. Unfortunately, the increased efficiency is not as great as desired because fluid flow around the blade is only stopped at the location of the tab and fluid can still flow around the blade at other locations because the tab, as a practical matter, cannot be expected to hold the rest of the edge of the blade tightly against the shell. This is true at least due to variations in insertable distance of the tab and variations in curvature of the shell relative to curvature of the blade. A further serious disadvantage of this structure is that there is no positive holding force applied to the blade since the tab does not pass through the shell of the turbine but merely rests within a depression by friction.

All of the U.S. patents described above are incorporated by reference herein as background art.

BRIEF SUMMARY OF THE INVENTION

In accordance with the invention a torque converter structure is provided wherein a plurality of high efficiency weld free connections between at least one of the pump and its blades and the turbine and its blades that overcomes or reduces the disadvantages associated with prior torque converters as described in the Background of the Invention above.

More particularly at least one blade within the torque converter is securely mechanically attached to the shell of the pump or turbine in the absence of welding by providing a tab on the blade that is bent on a portion that passes through a slit in the shell to secure the blade to the shell and by inserting a major part (greater than 50%) of a portion of an edge of the blade that runs coextensively with a surface of the shell into a depression in that shell until the edge of the blade diverges from the shell.

The torque converter includes a pump and a turbine. The pump includes a series of pump blades connected at an internal surface of a shell of the pump. The turbine includes a series of turbine blades connected at an internal surface of a shell of the turbine. The pump is directly or indirectly connectable to an engine's power shaft such that when the pump is rotationally driven by the engine, its blades can direct flow of fluid contained in the torque converter to the blades of the turbine to rotationally drive the turbine. The turbine is connectable to an input shaft of a transmission. A plurality of high efficiency weld free connections between a shell of at least one of the pump and the turbine and at least one blade is provided at an internal surface of the shell. The connections include a tab on the blades that is bent on a portion that passes from the internal surface to which it is to be connected, through a slit in the shell, to secure the blade to the shell. The connection also has a major part (greater than 50%) of a portion of a curved edge of the blade located in a depression in the shell to which the blade is connected and matching a curve of the internal surface of the shell to which it is connected.

The invention further includes a method for making such a torque converter by forming a turbine blade having an edge having a mating curvature to a curvature of at least one of a pump or turbine shell to which it is to be secured; providing at least one tab on the blade and at least one slit in the shell such that the mating curvatures are coextensive when the at least one tab is inserted through one of the at least one slits, the tabs and slits being coextensive with no more than 25% of the mating curvatures; providing a depression into the shell along the mating curvature that is at least 50% of the length of the mating curvature; inserting the tab through the slit and the mating portion of the blade edge that matches the depression into the depression; and bending the tab to secure the blade to the shell.

BRIEF DESCRIPTION OF THE SEVERAL VIEWS OF THE DRAWINGS

The nature and mode of operation of the present invention will be more fully described in the following detailed description of the invention taken with the accompanying drawing figures, in which.

DETAILED DESCRIPTION OF PREFERRED EMBODIMENTS OF THE INVENTION

It is to be understood that "blades" as used herein means the structures protruding from the bodies of the pump and turbine having surfaces that, in the case of the pump, expel fluid or, in the case of the turbine, surfaces that receive the force of fluid expelled from the pump to rotate the turbine. The term "blades" includes alternative names typically applied to such structures including for example "vanes".

The invention is a torque converter having a plurality of high efficiency weld free connections between at least one of the pump and its blades and the turbine and its blades that overcomes or reduces the disadvantages associated with prior torque converters as described in the Background of the Invention above.

In particular, the torque converter of the invention does not require welding of blades to the bodies of the pump or the turbine; the blades are held securely so as to reduce or eliminate vibration, noise and catastrophic failure. Gaps between the blades and bodies are largely blocked to greatly reduce fluid by-pass thus increasing efficiency and the parts are simple to manufacture and assemble.

The torque converter includes a pump and a turbine, each of the pump and turbine including a rotatable assembly having a hollow shell. The hollow shell usually has an external convex surface in the shape of a toroidal section defined by cutting through a torus along an external circumference.

In this regard, a torus is broadly defined in that a circle or any other closed curve, having a longitudinal axis 81 passing through an area defined by the curve, may be rotated about another longitudinal axis parallel to axis 81 external to the curve to define the torus. (See FIGS. 12*a* and 12*b*.) The closed curve may be any closed curve, e.g. an ellipse, joined mirror image parabolas, or joined mirror image hyperbolas. The closed curve may include sharp angles and need not be symmetrical.

The hollow shell has an internal concave surface generally corresponding to its external convex surface.

As previously discussed, the torque converter of the invention has a pump, and a turbine and each of the pump and turbine has a rotatable assembly having a hollow shell with an external convex surface and internal concave surface. Each of the rotatable assemblies has a series of blades connected with and inwardly protruding from its internal concave surface. The pump is directly or indirectly connectable to an engine's power shaft such that when the pump is rotationally driven by the engine, its blades can direct flow of fluid contained in the torque converter to the blades of the turbine to rotationally drive the turbine. The turbine is in turn connectable to an input shaft of a transmission. A plurality of high efficiency weld free connections are provided between at least some of the blades and its connected shell. The weld free connections have at least one tab on at least some of the blades that is bent on a portion that passes from the internal surface to which it is to be connected, through a slit in the shell, to secure the blade to the shell and by having a major part, of a portion of an edge of the blade that is coextensive with the internal surface of its connected shell, located in a depression in its connected shell.

The invention also includes a method for making a torque converter by forming at least one turbine blade having an edge having a mating curvature to a curvature of an internal surface of at least one of a pump or turbine shell to which it is to be secured; providing at least one tab on the blade and a slit in the shell such that the mating curvatures are coextensive when the tab is inserted through the slit, the tab and slit being coextensive with no more than 25% (maximum portion) of the mating curvatures; providing a depression into the shell along the mating curvature that is at least 50% (minimum portion) of the length of the mating curvature; inserting the tab through the slit and the mating portion of the blade edge that matches the depression into the depression; and bending the tab to secure the blade to the shell.

The preferred blade has an edge shaped so that at least a portion of the edge can be coextensive with the internal surface of the hollow shell with which it is to be connected and so that a major part of the coextensive portion can be inserted into a depression in the internal surface of the shell with which it is to be connected. The preferred blade further has at least one tab for passage through a slit in the hollow shell that can be bent on a portion that passes from the internal surface, through a slit in the shell, to secure the blade to the shell. A plurality of tabs are preferably provided on the blade that are insertable through corresponding slits in the shell to which it is to be connected.

Stated another way, at least one turbine blade for a torque converter is provided having an edge having a mating curvature to a curvature of an internal surface of at least one of a pump or turbine shell of the torque converter to which it is to be secured, the blade having a tab for insertion through a slit in the pump or turbine shell of the torque converter such that the mating curvatures are coextensive when the tab is inserted through the slit and bent to secure the blade to the pump or turbine shell of the torque converter to which it is to be secured, the tab and slit being coextensive with no more than 25% of the mating curvatures; and the edge being sized for tight insertion into a depression in the shell along the mating curvature that is at least 50% of the length of the mating curvature.

Figure 3:
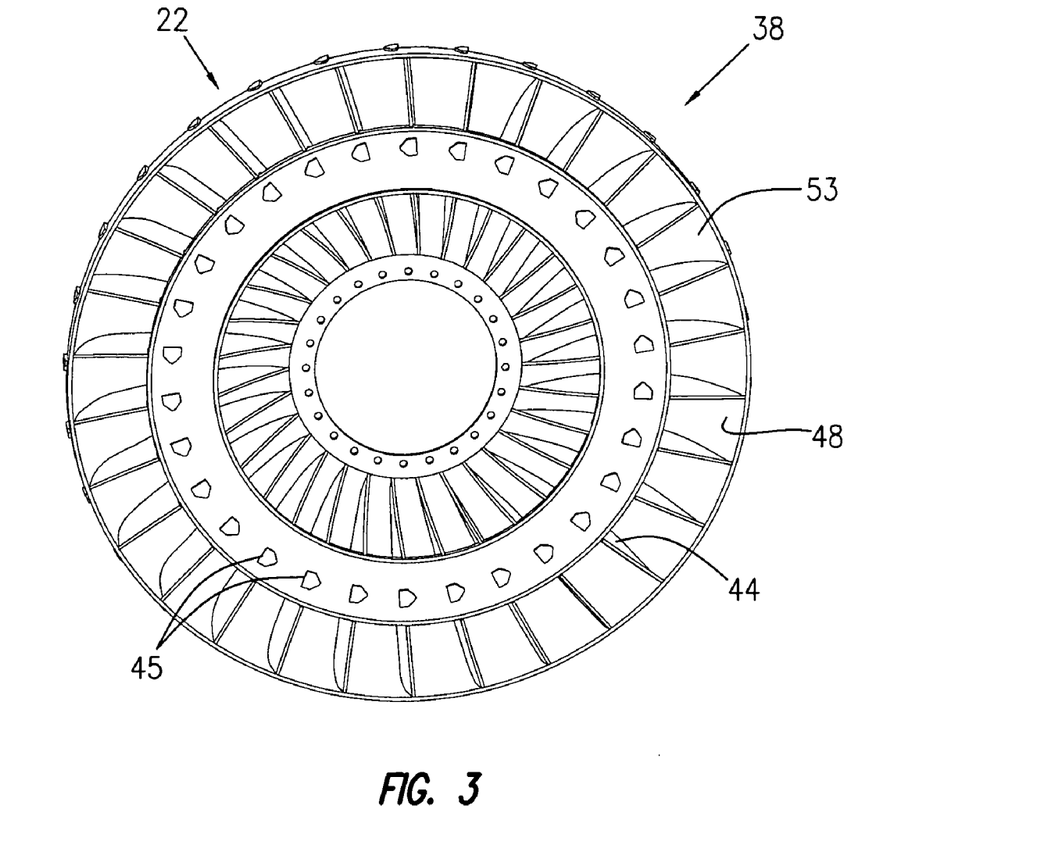
FIG. 3 is a perspective view of a torque converter turbine of the invention having a plurality of blades of the present invention connected therein.
Figure 4:
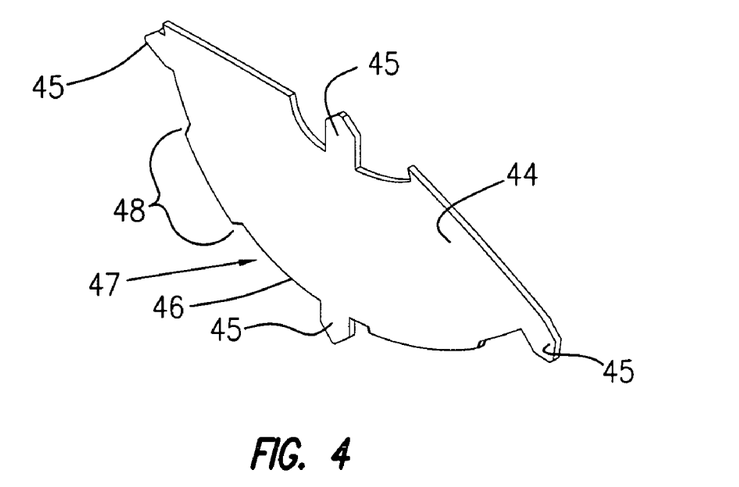
FIG. 4 is a perspective view of a blade of the present invention.

Referring now to the drawings: FIG. 3 is a perspective view of a torque converter turbine 38 of the invention having a shell 22 with internal concave surface 53 and external convex surface 53*a* (best seen in FIG. 7) having blades 44. As seen in this drawing and in FIGS. 4 and 7, tabs 45 are provided on the blades as is at least a portion 46 of an edge 47 that is shaped to match and be coextensive with an internal surface 53 of turbine shell 22. The portions 46 of the edges 47 of the blades are further provided with extended portions 48 for insertion into corresponding depressions 50 in internal surface 53 of turbine shell 22 as seen in FIG. 7.

Figure 5:
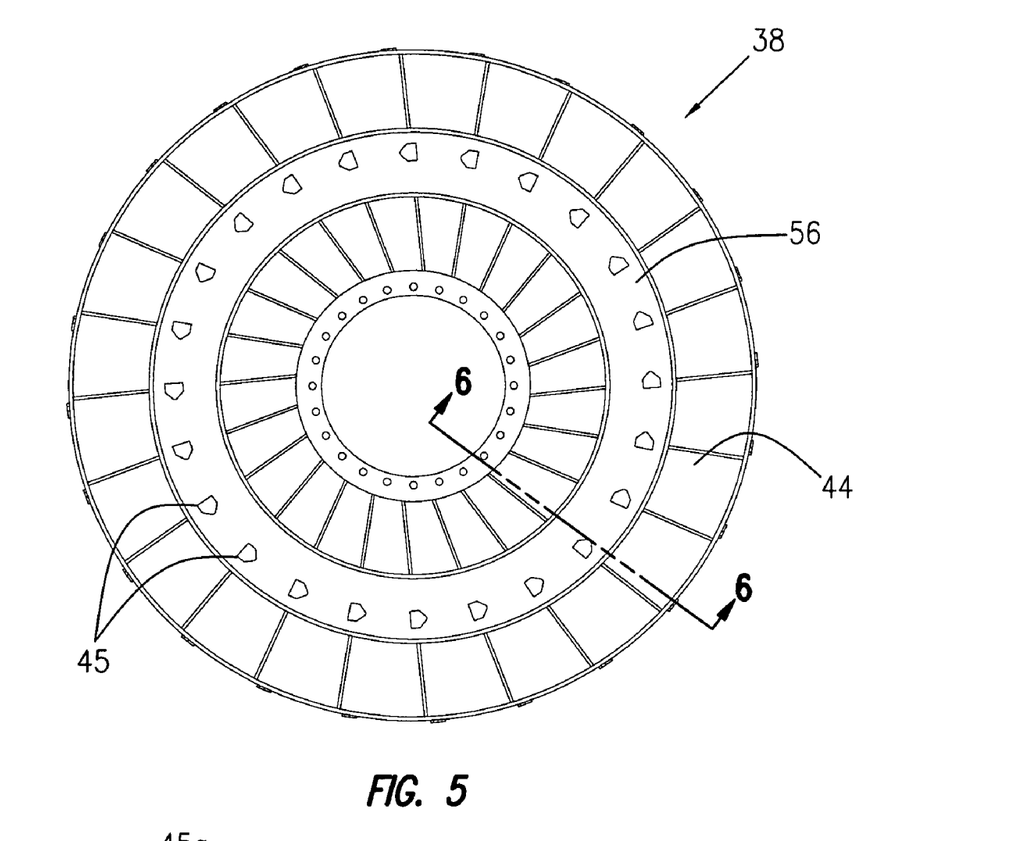
FIG. 5 is a top plan view of the torque converter turbine of FIG. 3 having a plurality of blades of the present invention connected therein.

FIG. 5 is similar to FIG. 3 except that FIG. 5 is a plan view.

Figure 6:
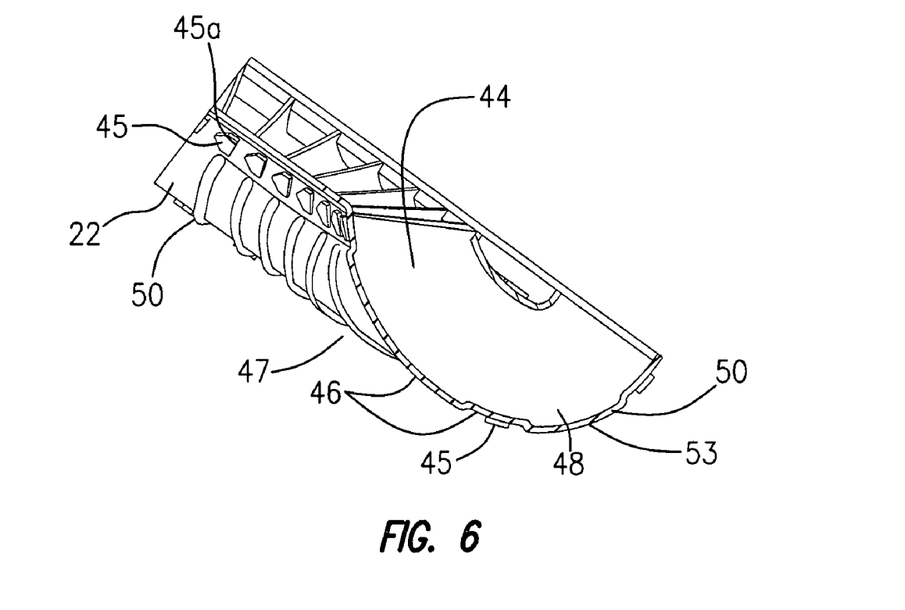
FIG. 6 is a cross sectional view of the torque converter turbine of FIG. 5 taken generally along line 6-6.

FIG. 6 is taken on section 6-6 of FIG. 5 and shows shell 22 to which blades 44 are connected. This figure more clearly shows the portions 46 of the edges 47 of the blades and the extended portions 48 for insertion into corresponding depressions 50 in internal surface 53 of turbine shell 22.

Figure 7:
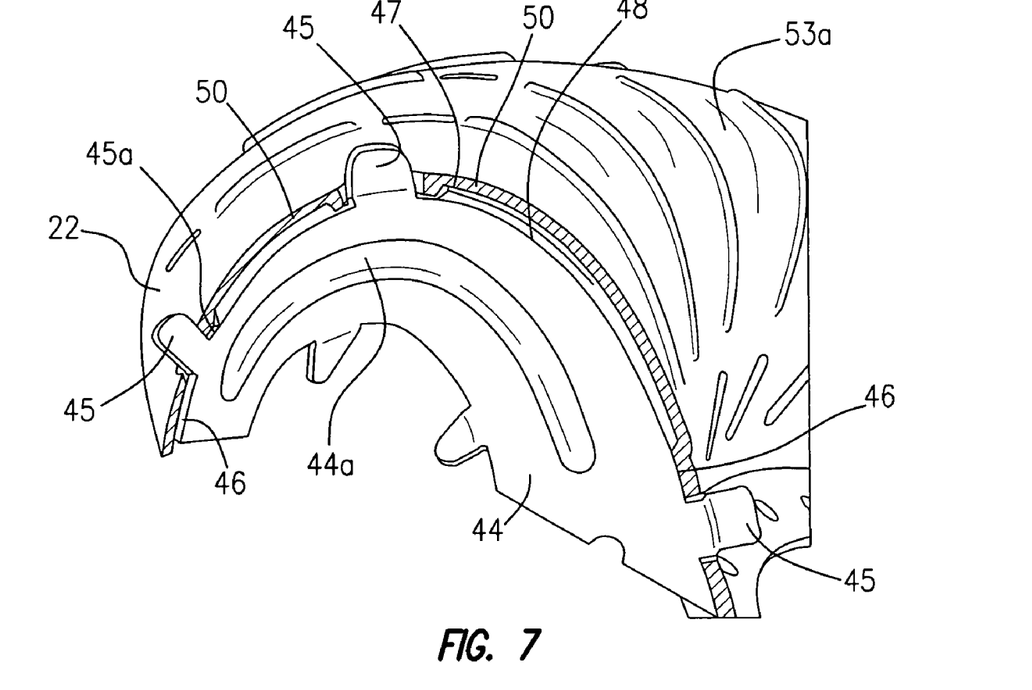
FIG. 7 is a cross sectional perspective view of a blade of the present invention showing insertion into a shell of a torque converter turbine.

FIG. 7 is a cross sectional perspective view of a blade 44 inserted into a shells 22 and/or 24. Tabs 45 are clearly visible passing through the shell 22 through slits 45*a*. Extended portions 48 and depressions 50 are also clearly visible in FIG. 7. The coextending edge parts 46 are clearly visible within depressions 50. FIG. 7 also shows the embodiment of blade 44 that includes side groove 44*a*. Side groove 44*a* may be present to increase the efficiency of fluid flow within shells 22 and/or 24.

Figure 8:
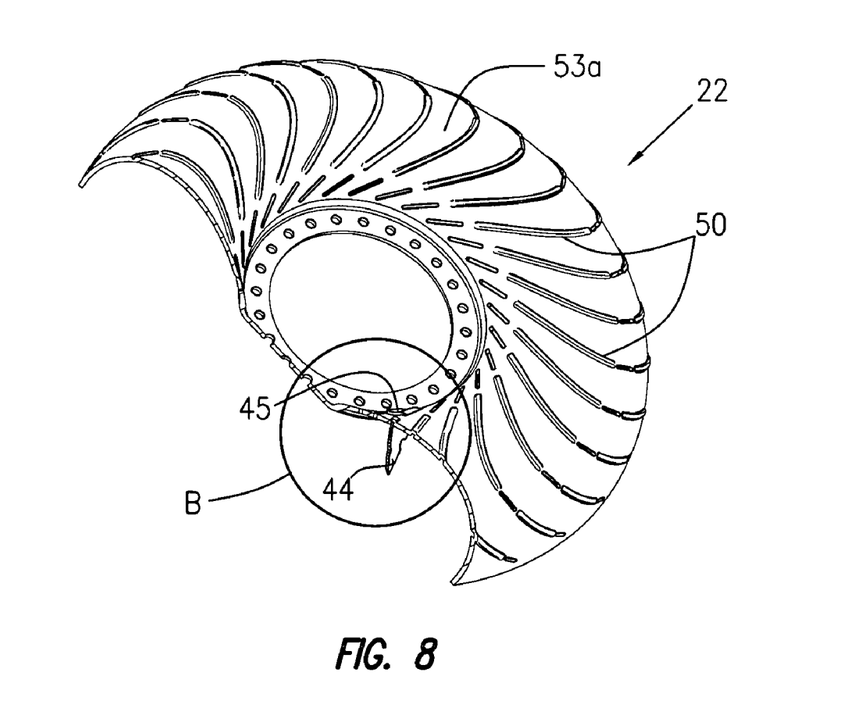
FIG. 8 is a perspective cross sectional end view of a shell of a torque converter of the invention showing a blade of the invention connected to the shell.
Figure 8A:
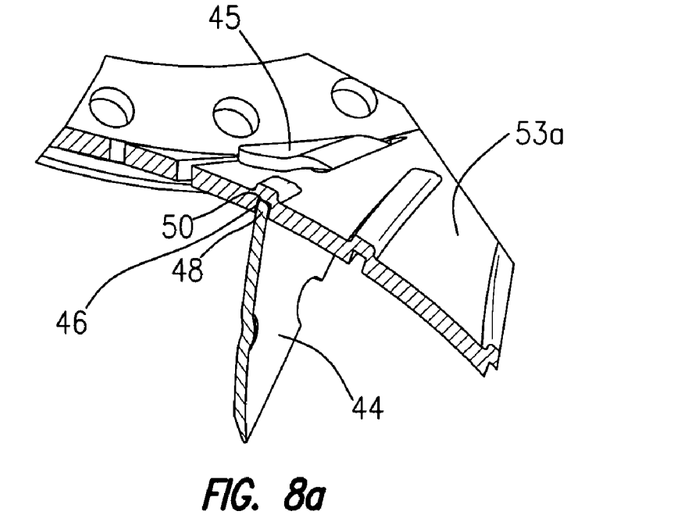
FIG. 8a is a perspective cross sectional end view of a blade of the invention connected to a shell magnified as section B from FIG. 8.
Figure 9:
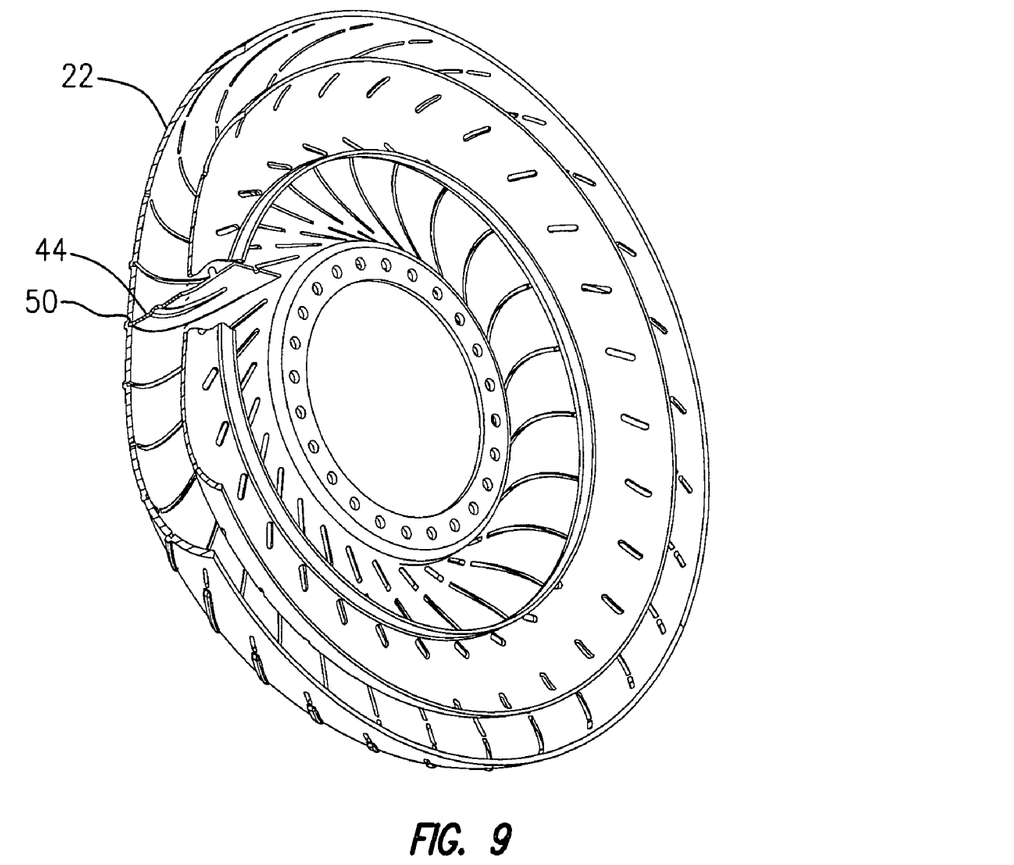
FIG. 9 is a further perspective cross sectional end view of a shell of a torque converter of the invention showing a blade of the invention connected to the shell.
Figure 9A:
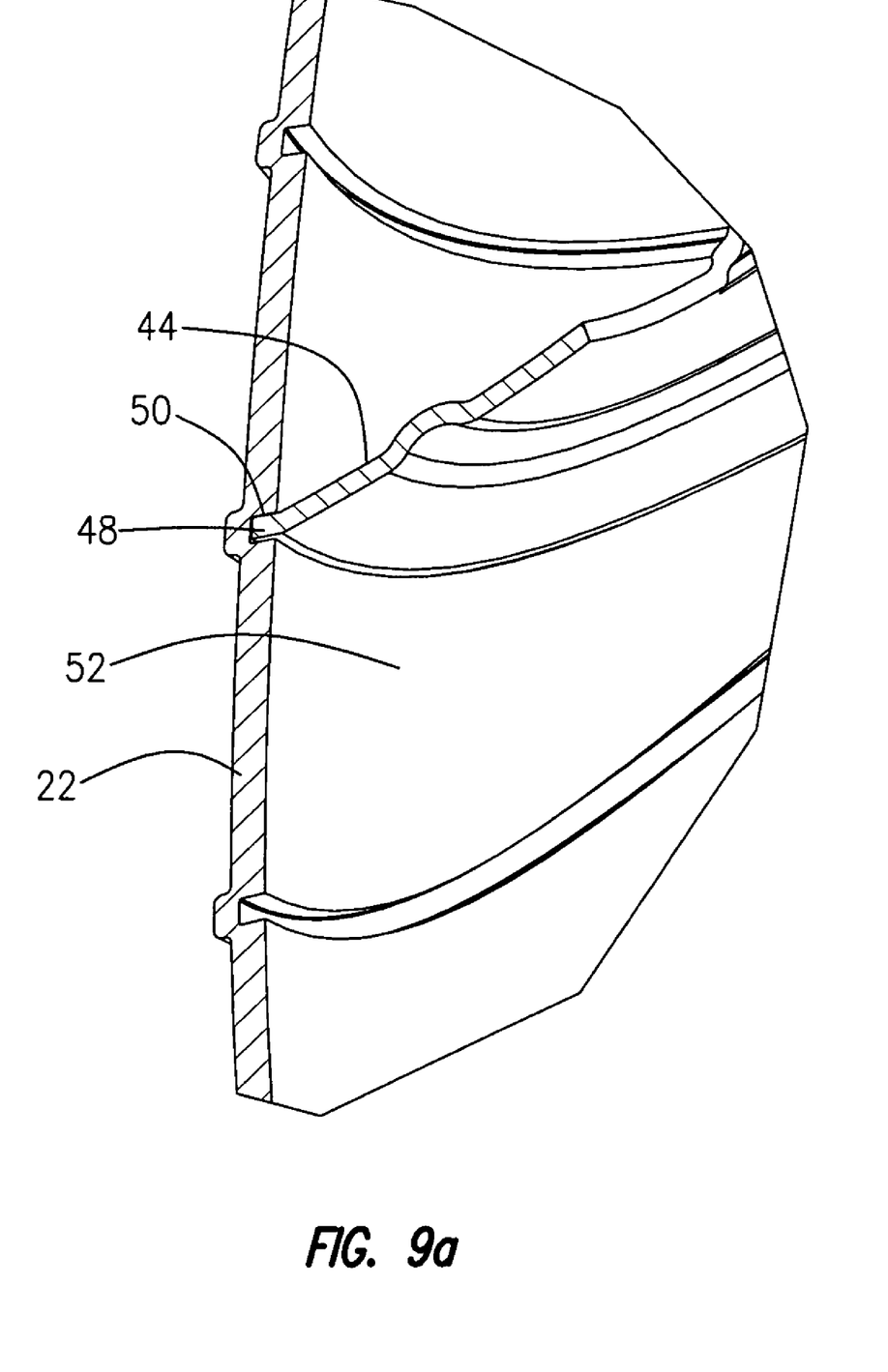
FIG. 9a is a further perspective cross sectional end view of a blade of the invention connected to a shell magnified as section A from FIG. 9.

FIG. 8 also shows a tab 45, an extended portion 48 and a depression 50 into which extended portion 48 has been inserted. FIG. 8*a* shows a magnified portion B of FIG. 8 to more clearly illustrate extended portions 48 and depressions 50 and coextending edge part 46 within depression 50. A tab 45 is also clearly shown in a bent position to hold blade 44. FIGS. 9 and 9*a* further illustrate the insertion of extended portions of blades 44 into depressions 50 in the internal surface 52, 53 of a shell 22, 24. FIG. 9 illustrates that the shells may be in the form of a toroidal section 54.

Figure 10:
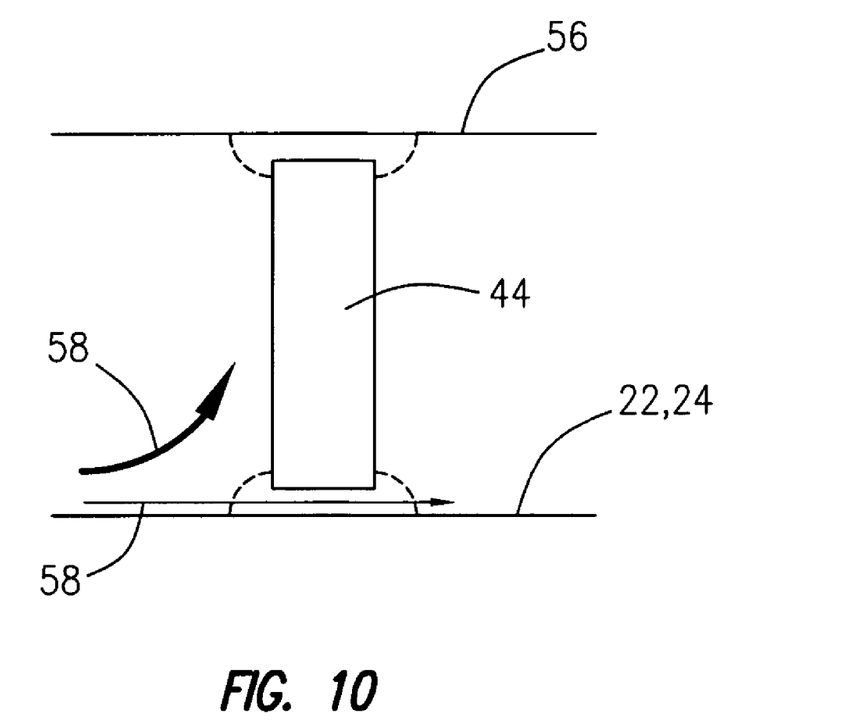
FIG. 10 is a flow diagram of torque converter fluid using a non-welded connection as disclosed in the prior art.
Figure 11:
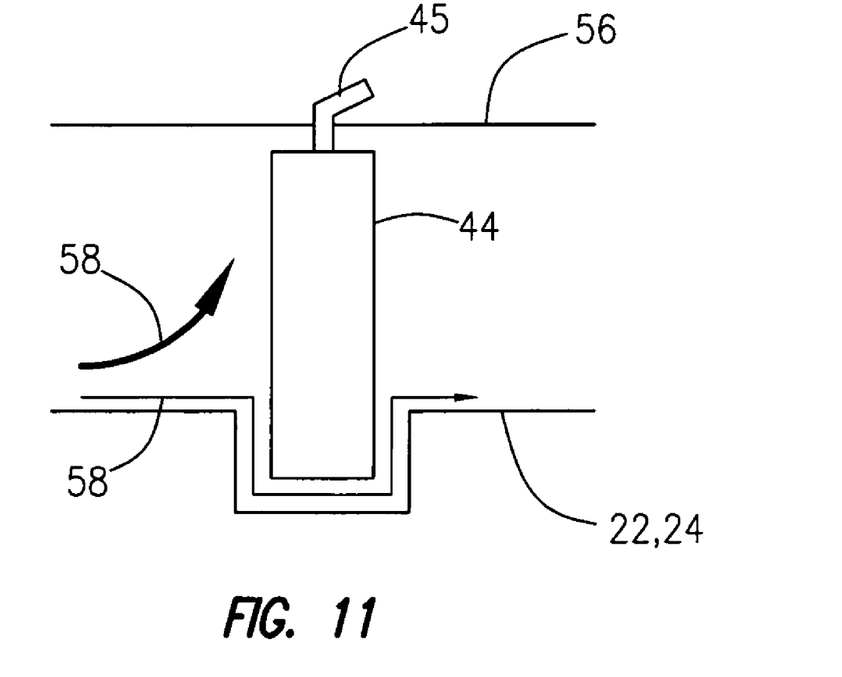
FIG. 11 is a flow diagram of torque converter fluid 58 using a non-welded connection in accordance with the present invention.

FIG. 10 illustrates flow 58 of fluid in a torque converter having mechanically connected vanes in the prior art. Leakage is apparent between the blade 44 and the shell 22, 24 in the form of a split in flow 58. FIG. 11 illustrates flow of fluid in a torque converter having mechanically connected vanes in accordance with the invention. Reduced leakage occurs between the blade 44 and the shell 22, 24. A shroud 56 is shown that further stabilizes blade 44 by interconnecting it with other blades.

Figure 12A:
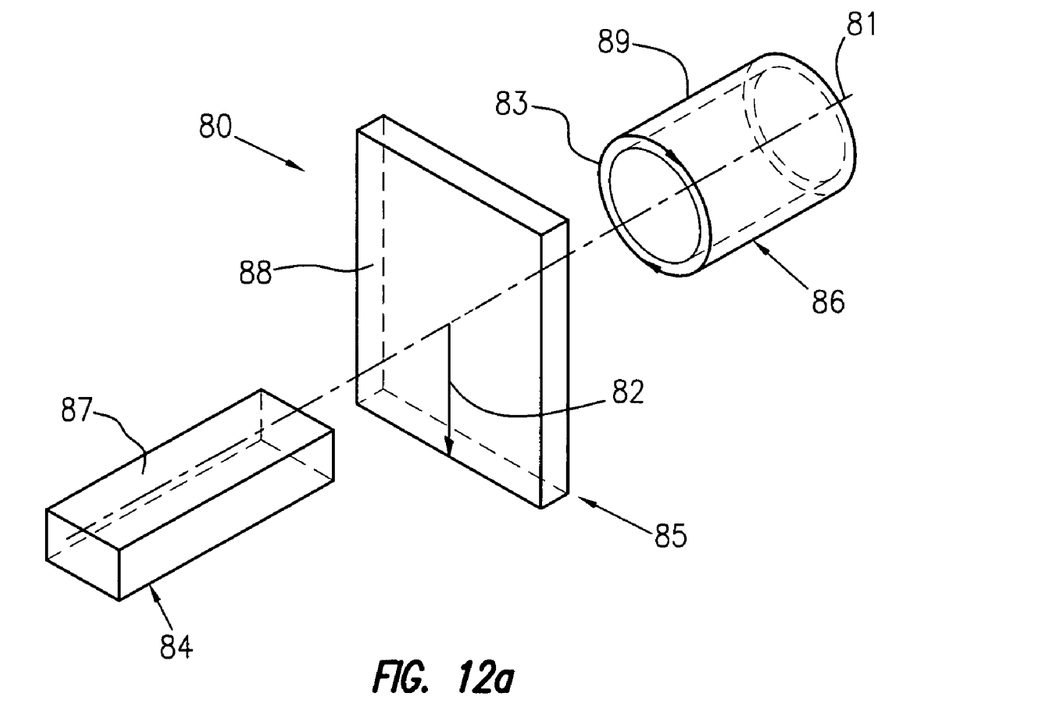
FIG. 12a is a perspective view of a cylindrical coordinate system demonstrating spatial terminology used in the present application.

FIG. 12*a* is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 12B:
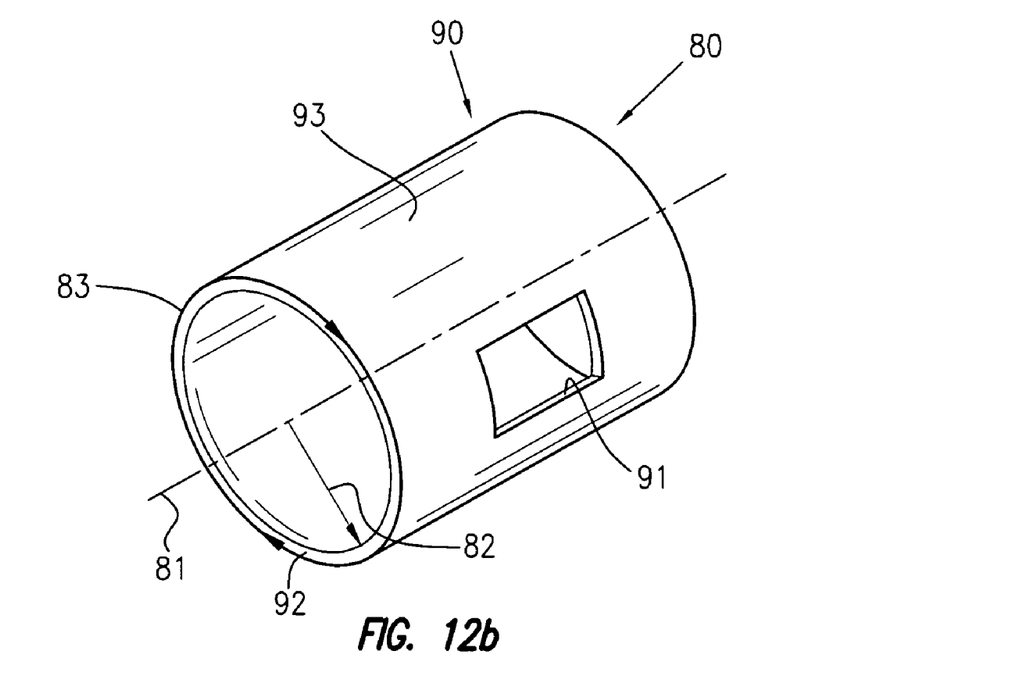
FIG. 12b is a perspective view of an object in the cylindrical coordinate system of FIG. 12a demonstrating spatial terminology used in the present application.

FIG. 12b is a perspective view of object 90 in cylindrical coordinate system 80 of FIG. 12a demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Thus it is seen that the objects of the invention are efficiently obtained, although changes and modifications to the invention should be readily apparent to those having ordinary skill in the art, which changes would not depart from the spirit and scope of the invention as claimed.

What we claim is:

1. A blade for weld free connection within a torque converter, which torque converter comprises a pump, and a turbine, each of said pump and turbine comprising a rotatable assembly having a hollow shell, having an external convex surface in the shape of a toroidal section as defined by cutting through a torus along an external circumference and having an internal concave surface corresponding to its external convex surface, said blade having an edge shaped so that at least a portion of the edge can be coextensive with the internal surface of the hollow shell with which it is to be connected and so that a major part of said coextensive portion can be inserted into a depression in the internal surface of the shell with which it is to be connected, said blade further comprising at least one tab for passage through a slit in the shell that can be bent on a portion that passes from the internal surface, through a slit in the shell, to secure the blade to the external convex surface of the shell.

2. The torque converter blade of claim 1 wherein a plurality of tabs are provided on the blade that are insertable through corresponding slits in the shell to which it is to be connected.

3. A torque converter comprising a pump and a turbine, each of said pump and turbine comprising a rotatable assembly having a hollow shell, having an external convex surface in the shape of a toroidal section defined by cutting through a torus along an external circumference and having an internal concave surface corresponding to its external convex surface, at least one of said rotatable assemblies comprising a series of blades connected with and inwardly protruding from its internal concave surface, said pump being directly or indirectly connectable to an engine's power shaft such that when the pump is rotationally driven by the engine, its blades can direct flow of fluid contained in the torque converter to the blades of the turbine to rotationally drive the turbine; said turbine being connectable to an input shaft of a transmission; wherein, a plurality of high efficiency weld free connections are provided between at least some of the blades and its connected shell, which weld free connections comprise at least one tab on blades that is bent on a portion that passes from the internal surface to which it is to be connected, through a slit in the shell, to secure the blade to the external convex surface of the shell and by having a major part of a portion of an edge of the blade that is coextensive with the internal surface of its connected shell located in a depression in its connected shell.

4. The torque converter of claim 3 wherein a plurality of tabs are provided on the blade that are inserted through corresponding slits in the shell to which it is to be connected.

5. The torque converter of claim 3 wherein each of said pump rotatably assembly and said turbine rotatable assembly include said plurality of high efficiency weld free blade connections.

6. A method for making a torque converter according to claim 3 by forming at least one turbine blade having an edge having a mating curvature to a curvature of an internal surface of at least one of a pump or turbine shell to which it is to be secured; providing at least one tab on the blade and a slit in the shell such that the mating curvatures are coextensive when the tab is inserted through the slit, said tab and slit being coextensive with no more than 25% of the mating curvatures; providing a depression into the shell along the mating curvature that is at least 50% of the length of the mating curvature; inserting the tab through the slit and the mating portion of the blade edge that matches the depression into the depression; and bending the tab to secure the blade to the external convex surface of the shell.

7. A turbine blade for a torque converter, said blade having an edge having a mating curvature to a curvature of an internal surface of at least one of a pump or turbine shell of the torque converter to which it is to be secured, said blade having a tab for insertion through a slit in the pump or turbine shell of the torque converter such that the mating curvatures are coextensive when the tab is inserted through the slit and bent to secure the blade to the external convex surface of the pump or the external convex surface of the turbine shell of the torque converter to which it is to be secured, said tab and slit being coextensive with no more than 25% of the mating curvatures; and said edge being sized for tight insertion into a depression in the shell along the mating curvature that is at least 50% of the length of the mating curvature.

* * * * *